United States Patent [19]

Satoh et al.

[11] Patent Number: 5,039,321
[45] Date of Patent: Aug. 13, 1991

[54] APPARATUS FOR PREVENTING CLOUDING OF A SEMICONDUCTOR WAFER

[75] Inventors: Kazuo Satoh; Yohji Ogawa; Hirofumi Okano, all of Nishi-Okitama; Kiyomi Suzuki, Higashi-Okitama, all of Japan

[73] Assignee: Toshiba Ceramics Co., Ltd., Tokyo, Japan

[21] Appl. No.: 429,733

[22] Filed: Oct. 31, 1989

[30] Foreign Application Priority Data

Nov. 4, 1988 [JP] Japan .................. 63-278587

[51] Int. Cl.$^5$ ............................................ B01D 47/00
[52] U.S. Cl. ........................................ 55/259; 55/316; 55/385.2; 55/387; 98/115.3
[58] Field of Search ............... 55/73, 316, 259, 387, 55/385.2; 98/34.6, 115.3; 118/DIG. 7, 719, 733

[56] References Cited

U.S. PATENT DOCUMENTS

| | | | |
|---|---|---|---|
| 4,374,813 | 2/1983 | Chen et al. | 55/259 |
| 4,549,472 | 10/1985 | Endo et al. | 98/34.6 |
| 4,630,530 | 12/1986 | Eckstrom et al. | 55/316 |
| 4,684,510 | 8/1987 | Harkins | 55/97 |

FOREIGN PATENT DOCUMENTS

| | | | |
|---|---|---|---|
| 13473 | 2/1977 | Japan | 55/73 |
| 12904 | 5/1978 | Japan | 55/385.2 |
| 83171 | 7/1978 | Japan | 55/316 |
| 152661 | 1/1979 | Japan | 55/387 |
| 39224 | 3/1980 | Japan | 55/387 |
| 125233 | 9/1985 | Japan | 55/387 |
| 131131 | 6/1987 | Japan | 98/34.6 |

Primary Examiner—Bernard Nozick
Attorney, Agent, or Firm—Nixon & Vanderhye

[57] ABSTRACT

An apparatus for preventing clouding of a mirror-finished semiconductor wafer in a semiconductor wafer treating zone by controlling an internal atmosphere in the semiconductor wafer treating zone. The apparatus has an air conditioner for introducing the air from an external environment into the semiconductor wafer treating zone, and a removing device disposed in the air conditioner or between the air conditioner and the external environment for removing at least part of the sulfur oxides out of the sulfur oxides and nitrogen oxides in the air introduced from the external environment. The air introduced through the air conditioner and the cleaning device forms an atmosphere including a sulfur oxide concentration of 60 ng/l or less in the semiconductor wafer treating zone.

4 Claims, 1 Drawing Sheet

APPARATUS FOR PREVENTING CLOUDING OF A SEMICONDUCTOR WAFER

BACKGROUND OF THE INVENTION

The present invention relates to an apparatus for preventing clouding of a semiconductor wafer. More particularly, the invention is concerned with an apparatus which maintains at least the sulfur oxides concentration out of the sulfur oxides concentration and the nitrogen oxides concentration in the atmosphere of a semiconductor wafer treating zone below a predetermined level, so as to prevent clouding of a mirror-finished semiconductor wafer surface.

It is known that a mirror-finished semiconductor wafer surface treated in a wafer treating zone is gradually clouded by precipitates of components contained in the treating atmosphere such as water, nitrogen oxides (NOx), sulfur oxides (SOx), ammonia and so forth. Such clouding of the mirror-finished wafer surface seriously impedes subsequent steps of the semiconductor production process.

An apparatus have been proposed in order to eliminate the problem of clouding. For instance, an apparatus has been proposed in which the air in the semiconductor wafer treating zone is treated with a water absorbent or a dehumidifier so as to remove moisture content in the region near the semiconductor wafer surface. An apparatus also has been proposed in which the amount of alkali component derived from a semiconductor wafer scrubbing chamber is minimized.

Unfortunately, however, these known apparatus suffer from the following problems.

Namely, since the treatment of a semiconductor wafer essentially requires that the treating atmosphere contains an adequate amount of water so that the apparatus of the first-mentioned type is materially not allowed to reduce the water or moisture content to a level which is low enough to prevent clouding. The second-mentioned method also encounters with difficulty in reducing the alkali content to a level low enough to prevent clouding, because alkali substance such as ammonia is used in a large amount in a scrubbing chamber in which a scrubbing operation is conducted as a step immediately before the treatment of the wafer.

Therefore, it has been impossible to sufficiently prevent clouding of the semiconductor wafer with known techniques.

SUMMARY OF THE INVENTION

Accordingly, an object of the present invention is to provide an apparatus for preventing clouding of a semiconductor wafer which maintains at least the sulfur oxides concentration out of the sulfur oxides concentration and the nitrogen oxides concentration in the atmosphere of a semiconductor wafer treating zone below predetermined levels, so as to prevent clouding of a mirror-finished semiconductor wafer surface, thereby overcoming the above-described problems of the prior art.

To this end, according to the present invention, there is provided an apparatus for preventing clouding of a mirror-finished semiconductor wafer in a semiconductor wafer treating zone by controlling an internal atmosphere in the semiconductor wafer treating zone, comprising: an air conditioning means for introducing the air from an external environment into the semiconductor wafer treating zone; and removing means disposed in the air conditioning means or between the air conditioning means and the external environment for removing at least part of the sulfur oxides from the sulfur oxides and nitrogen oxides in the air introduced from the external environment; the internal atmosphere in the semiconductor wafer treating zone having a sulfur oxide concentration of 60 ng/l or less.

According to the invention having the features set forth above, it is possible to sufficiently reduce the level of the sulfur oxides concentration or, alternatively, both the sulfur oxides concentration and the nitrogen oxides concentration, in the treating atmosphere in the semiconductor wafer treating zone, so that the tendency for clouding of the semiconductor wafer surface can be suppressed to a satisfactory level.

DESCRIPTION OF THE PREFERRED EMBODIMENTS

The apparatus of the present invention for preventing clouding of a semiconductor wafer has an air conditioning means for introducing air from the external environment into a semiconductor wafer treating zone, and cleaning means disposed in the air conditioning means or between the air conditioning means and the external environment, the cleaning means being capable of removing part of at least sulfur oxides from the sulfur oxides and nitrogen oxides in the air from the external environment; whereby an atmosphere having a sulfur oxide concentration of 60 ng/l is formed in the semiconductor wafer treating zone.

As explained above, the apparatus of the invention having the features set forth above can sufficiently reduce at least the sulfur oxides concentration from the sulfur oxides concentration and the nitrogen oxides concentration, in the treating atmosphere in the semiconductor wafer treating zone, the tendency for clouding of the semiconductor wafer surface can be suppressed to a satisfactory level.

Preferred embodiments of the apparatus of the invention for preventing clouding of a semiconductor wafer will be described hereinunder. It is to be noted, however, the following description of embodiments is only for the purpose of facilitating or promoting understanding of the invention, and is not intended for limiting the scope of the invention. Thus, all modifications or substitutions of equivalent parts in the described embodiments, which are made without departing from the spirit and technical scope of the invention, are to be understood to fall within the scope of the present invention.

Figure 1:
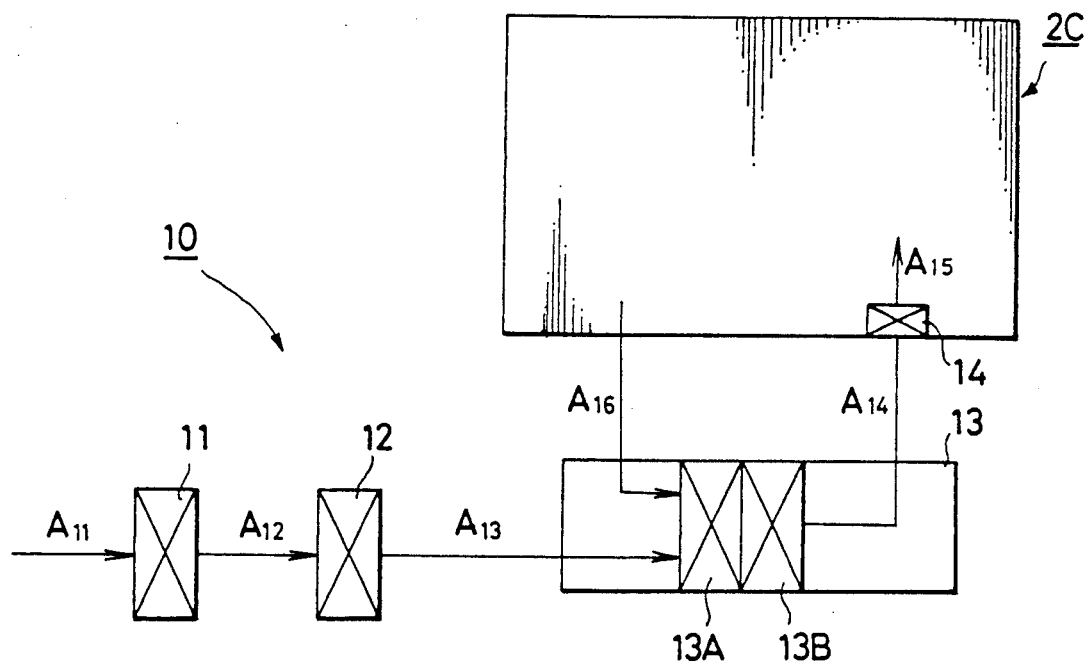
FIG. 1 is an illustration of an embodiment of an apparatus of the invention for preventing clouding of a semiconductor wafer surface.
Figure 2:
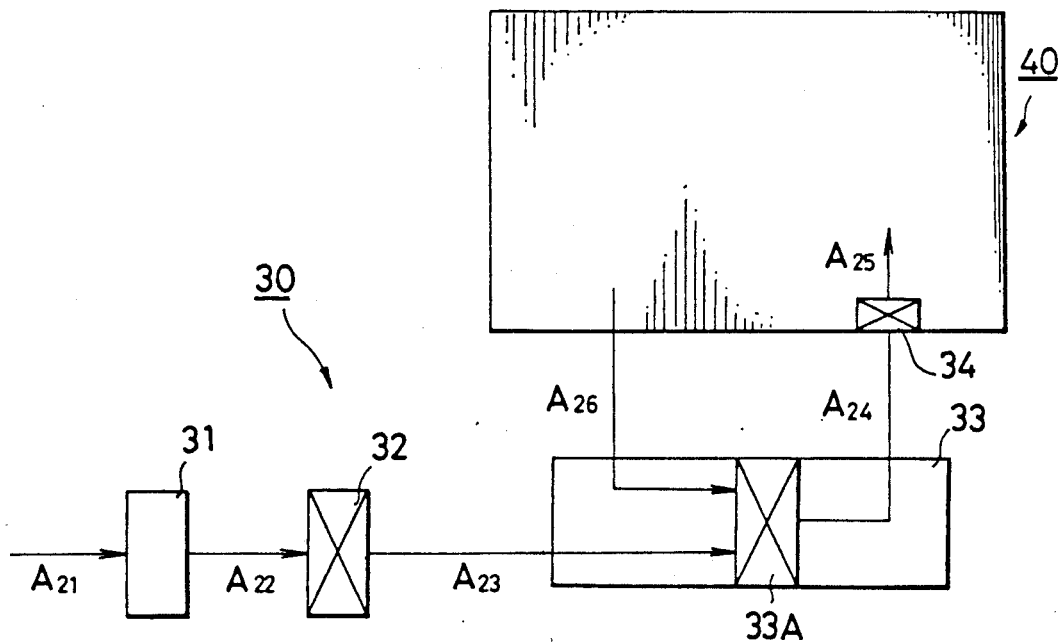
FIG. 2 is an illustration of another embodiment of the apparatus for preventing clouding of a semiconductor wafer surface.

FIG. 1 is an illustration of an embodiment of an apparatus of the invention for preventing clouding of a semiconductor wafer surface; and FIG. 2 is an illustration of another embodiment of the apparatus for preventing clouding of a semiconductor wafer surface.

The construction and operation of the first embodiment of the invention will be described with reference to FIG. 1.

An apparatus for preventing clouding of a semiconductor wafer is generally denoted by a numeral 10. The apparatus 10 has a first filter 11 which opens at its inlet side to the external environment so as to pass air $A_{11}$ supplied from the environment while trapping dust and other contaminant from the air $A_{11}$. The apparatus 10 also has a second filter 12 which communicates at its inlet side with the outlet side of the first filter 11 and which is capable of adsorbing and removing part of at least sulfur oxides SOx, preferably parts of both of sulfur oxide SOx and nitrogen oxides NOx, from the air $A_{12}$ which has been given from the first filter 11. The apparatus 10 further has an air conditioner 13 connected to the outlet side of the second filter 12. Preferably, the second filter 12 is an activated carbon filter containing a mass of activated carbon or a chemical filter composed of a carrier such as of zeolite and a chemical adsorbent such as potassium permanganate, e.g., "PURE SMELL FILTER (Type E)" produced by Nippon Muki Kabushiki Kaisha). The use of such an activated carbon filter or chemical filter is preferred because such filter can adsorb both sulfur oxides SOx and nitrogen oxides NOx so as to reduce the concentrations of sulfur oxides and nitrogen oxides to levels low enough to prevent clouding.

The air conditioner 13 has a third filter 13A and a fourth filter 13B. The third filter 13A is capable of adsorbing and removing part of at least sulfur oxides SOx, preferably parts of both sulfur oxides SOx and nitrogen oxides NOx, from the air $A_{13}$ the sulfur oxides concentration, preferably both the sulfur oxides concentration and the nitrogen oxide concentration, has been reduced through the second filter 12. The air having the sulfur oxides concentration, preferably both the sulfur oxides and nitrogen oxides concentrations, reduced through the third filter is introduced to the fourth filter 13B which traps and removes fine dust particles from this air.

Numeral 20 generally designates a semiconductor wafer treating zone which conducts a desired treatment such as a surface treatment on the mirror-finished surface of a semiconductor wafer (not shown) or a mere transportation of the semiconductor wafer. The semiconductor wafer treating zone 20 is connected to the outlet end of the clouding prevention apparatus 10, i.e., to the outlet side of the air conditioner 13, through a fifth filter 14 which is capable of trapping and removing fine dust particles. The air $A_{14}$ from which water content has been removed and which has been heated to a suitable temperature through the air conditioner 13 is made to pass through the fifth filter 14 so that dust and other fine particles are removed to provide a clean air $A_{15}$ which is introduced into the space of the semiconductor wafer treating zone. Part of the air of the treating atmosphere is extracted as denoted by $A_{16}$ and returned to the inlet side of the air conditioner 13. The returning of the air $A_{16}$ to the inlet side of the air conditioner 13 is not essential. Namely, the air $A_{16}$ maybe discharged to the environment if desired. The following description, however, proceeds on an assumption that the air $A_{16}$ is returned to the inlet side of the air conditioner 13, for the sake of convenience in the explanation.

The operation of the described embodiment of the apparatus 10 for preventing clouding of a semiconductor after is as follows.

The air $A_{11}$ introduced from ambient space or environment is made to pass through the first filter 11 so that foreign matters such as dust particles are trapped and removed. The air is then introduced into the second filter 12 so that part of at least the sulfur oxides SOx, preferably parts of both the sulfur oxides SOx and nitrogen oxides NOx, are removed by adsorption.

The air $A_{13}$ from the second filter 12, with part of the sulfur oxides component, preferably sulfur oxide components SOx and nitrogen oxides NOx, removed by the second filter 12, is introduced to the inlet side of the air conditioner 13 so as to be made to pass through the third filter 13A so that part of at least the sulfur oxides SOx, preferably parts of the sulfur oxides SOx and nitrogen oxides NOx, is further removed from the air.

The air from the third filter 13A, part of at least the sulfur oxides SOx, preferably parts of sulfur oxides SOx and nitrogen oxides NOx, having been removed through the third filter 13A, is introduced into the fourth filter 13B so that fine dust particles and other fine particles are removed from this air. The thus formed clean air is then conditioned to suitable levels of humidity and temperature so that a conditioned air $A_{14}$ is formed and introduced into the fifth filter 14. The fifth filter 14 further remove fine dust and other particles to attain a desired level of cleanness and thus obtained clean air $A_{15}$ is introduced into the semiconductor wafer treating zone 20 so as to merge in the treating atmosphere.

The air $A_{15}$ introduced into the treating atmosphere in the semiconductor wafer treating zone 20 has, at least, a reduced sulfur oxides concentration of 60 ng/l or less, preferably a sulfur oxides concentration of 60 ng/l or less and a nitrogen oxides concentration of 50 ng/l or less, whereby clouding of the mirror-finished semiconductor wafer surface is materially avoided. Higher effect is preventing clouding of the mirror-finished semiconductor wafer surface can be attained by reducing the sulfur oxides concentration to a level of 20 ng/l or less.

The air $A_{16}$ of the treating atmosphere in the semiconductor wafer treating zone 20 tends to be contaminated by sulfur oxides SOx, nitrogen oxides NOx and dust which are freed and generated during the treatment such as the surface treatment of a silicon wafer in the treating atmosphere. In order to remove such contaminants, the air $A_{16}$ is returned to the inlet side of the air conditioner 13. The returned air $A_{16}$ is made to pass through the third filter 13A so that part of at least the sulfur oxides, preferably parts of sulfur oxides $SO_x$ and the nitrogen oxides NOx, are removed by adsorption. The air is then is made to pass through the fourth filter 13B so that part of fine dust and other particles is removed, and thus cleaned air $A_{14}$ is further cleaned through the fifth filter 14 and introduced as the cleaned air $A_{15}$ to merge in the atmOsphere in the semiconductor wafer treating zone 20.

A detailed description will be given of a second embodiment of the apparatus of the invention for preventing clouding of a semiconductor wafer, with specific reference to FIG. 2.

An apparatus for preventing clouding of a semiconductor wafer, which is the second embodiment of the present invention, is generally denoted by numeral 30. The apparatus 30 has a scrubber 31 which is communicated at its inlet side with the external environment and which is capable of removing, through absorption by water or other liquid, part of at least the sulfur oxides SOx, preferably parts of sulfur oxides SOx and nitrogen oxides NOx, from the air $A_{21}$ supplied from the external environment. The apparatus 30 also has a first filter 32 which is communicated at its inlet end to the outlet end of the scrubber 31 and which is capable of removing water mist particles and other particles from the air $A_{22}$ introduced from the scrubber 31. The apparatus 30 further has an air conditioner 33 which is connected at its inlet end to the outlet end of the first filter 32.

The air conditioner 33 has a second filter 33A for removing fine dust and other particles from the air $A_{23}$ introduced through the first filter 32.

Numeral 40 generally designates a semiconductor wafer treating zone which conducts a desired treatment such as a surface treatment on the mirror-finished surface of a semiconductor wafer (not shown) or a mere transportation of the semiconductor wafer. The semiconductor wafer treating zone 40 is connected to the outlet end of the clouding prevention apparatus 30, i.e., to the outlet side of the air conditioner 33, through a third filter 34 which is capable of trapping and removing fine dust particles to reduce the particle concentration to a suitable level. The air $A_{24}$ from which water content has been removed and which has been heated to a suitable temperature through the air conditioner 33 is made to pass through the third filter 34 so that dust and other fine particles are removed to provide a clean air $A_{25}$ which is introduced into the space of the semiconductor wafer treating zone. Part of the air of the treating atmosphere is extracted as denoted by $A_{26}$ and returned to the inlet side of the air conditioner 33. The returning of the air $A_{26}$ to the inlet side of the air conditioner 33 is not essential. Namely, the air $A_{26}$ maybe discharged to the environment if desired. The following description, however, proceeds on an assumption that the air $A_{26}$ is returned to the inlet side of the air conditioner 33, for the sake of convenience in the explanation.

The operation of the described apparatus 30 for preventing clouding of a semiconductor wafer operates in a manner which will be described hereinunder.

The air $A_{21}$ introduced from the external environment is made to pass through the scrubber 31 so that part of the sulfur oxides SOx, preferably parts of the sulfur oxides SOx and nitrogen oxides NOx, is removed by being absorbed in water or other liquid.

The air $A_{22}$, the sulfur oxides concentration, preferably both the sulfur oxides and nitrogen oxides concentrations, reduced through the scrubber 31 is introduced into the first filter 32 which removes particles of water or other liquid from the air $A_{22}$ to reduce the concentration of the particles down to a suitable level.

The air $A_{23}$ formed by removing water or other liquid particles from the air $A_{22}$ through the first filter 32 is introduced into the second filter 33A of the air conditioner 33 so that fine dust and other particles are removed to reduce the particle concentration to a suitable level. Then, the water content is removed to a suitable level and then the air is heated to a suitable temperature. The air $A_{24}$ thus formed is introduced into the third filter 34 in which fine dust and other particles are removed to attain a desired low level of particle concentration. The clean air $A_{25}$ thus formed is introduced into the semiconductor wafer treating zone 40 so as to be merged in the treating atmosphere.

The air $A_{25}$ introduced into the treating atmosphere in the semiconductor wafer treating zone 40 has, at least, a reduced sulfur oxides concentration of 60 ng/l or less, preferably a sulfur oxides concentration of 60 ng/l or less and a nitrogen oxides concentration of 50 ng/l or less, whereby clouding of the mirror-finished semiconductor wafer surface is materially avoided. Higher effect is preventing clouding of the mirror-finished semiconductor wafer surface can be attained by reducing the sulfur oxides concentration to a level of 20 ng/l or less.

The air $A_{26}$ of the treating atmosphere in the semiconductor wafer treating zone 40 tends to be contamination by sulfur oxides SOx, nitrogen oxides NOx and dust which are freed and generated during the treatment such as the surface treatment of a silicon wafer in the treating atmosphere. In order to remove such contaminants, the air $A_{26}$ is returned to the inlet side of the air conditioner 33. The returned air $A_{26}$ is made to pass through the second filter 33A so that dust and other particles are removed to a suitable level by the second filter 33A and the air $A_{24}$ thus formed is introduced into the third filter 34 and introduced again into the semiconductor wafer treating zone 40 after the cleaning through the third filter 34.

Two embodiments of the semiconductor wafer clouding prevention apparatus have been described with reference to FIGS. 1 and 2. The advantages of the invention will be more fully realized from the following illustration of example with numerical data.

EXAMPLE 1

A chemical filter "PURE SMELL FILTER (Type E)", which is produced by Nippon Muke Kabushiki Kaisha and which contains potassium permanganate carried by zeolite, was used as each of the second filter 12 and the third filter 13A of the arrangement of the first embodiment shown in FIG. 1. In consequence, the sulfur oxides concentration and the nitrogen oxide concentrations in the atmosphere within the semiconductor wafer treating zone were reduced to 2 ng/l.

The atmosphere in the semiconductor wafer treating zone had temperature of 23° C. and relative humidity of 50%. The ammonia content of this atmosphere was 80 ng/l. A semiconductor wafer immediately after the mirror-finishing was left in this atmosphere for 10 days but no clouding of the semiconductor wafer was observed.

A test also was conducted in which a semiconductor wafer immediately after the mirror-finishing was sealed in a hermetic case within the semiconductor wafer treating zone 20 and the hermetic case accommodating the semiconductor wafer was left in the external environment. The semiconductor wafer did not shown any clouding even after elapse of 6 months.

EXAMPLE 2

Water was used as the absorbent in the scrubber 31 of the embodiment shown in FIG. 2. The sulfur oxides concentration and nitrogen oxides concentration in the atmosphere within the semiconductor wafer treating zone 40 were as low as 5 ng/l and 8 ng/l, respectively.

The temperature and the relative humidity of the atmosphere in the semiconductor wafer treating zone 40 were 23° C. and 50%, respectively, while the ammonia concentration was 80 ng/l.

A semiconductor wafer immediately after the mirror-finishing was left in this atmosphere for 10 days but no clouding of the semiconductor wafer was observed.

A test also was conducted in which a semiconductor wafer immediately after the mirror-finishing was sealed within the semiconductor wafer treating zone 40 in a hermetic case and the hermetic case accommodating the semiconductor wafer was left in the external environment. The semiconductor wafer did not show any clouding even after elapse of 6 months.

COMPARISON EXAMPLE

A mirror-finished semiconductor wafer was left in a treating atmosphere of a typical conventional semiconductor wafer treating zone having temperature of 23° C., relative humidity of 50% and concentrations of sulfur oxides, nitrogen oxides and ammonia oxide of 93 ng/l, 57 ng/l and 80 ng/l, respectively. The semiconductor wafer showed clouding within one day.

A comparison between Examples 1, 2 and the comparison example clearly shows that the apparatus of the present invention provides a remarkable effect in preventing clouding of semiconductor wafers.

In the first embodiment described before, a chemical filter capable of removing part of at least sulfur oxides, preferably both the sulfur oxides and nitrogen oxides, is placed in the air conditioner 13. This, however, is only illustrative and it is possible to incorporate a filter capable of removing part of ammonia, (e.g., 'PURE SMELL FILTER (F type) produced by Nippon Muki Kabushiki Kaisha, containing phosphoric acid carried by zeolite, in the air conditioner 13 in addition to the filter capable of removing part of sulfur oxides, preferably parts of sulfur oxides and nitrogen oxides. It is also possible to provide a filter capable of removing ammonia, e.g., the above-mentioned PURE SMELL FILTER Type F, at the upstream or downstream side of the second filter 12. It will be clear that these modifications offer greater effects in preventing clouding of semiconductor wafers.

The second embodiment described in connection with FIG. 2 maybe modified such that the air $A_{26}$ of the treating atmosphere in the semiconductor wafer treating zone 40 is returned to the inlet side of the scrubber so that part of ammonia is removed from this air. In such a case, sulfur oxides, nitrogen oxides and ammonia exist simultaneously in the scrubber 31 so that neutralization reaction takes place to promote absorption of these oxides and ammonia.

In the described embodiments, the semiconductor wafer treating zones 20, 40 are clean rooms which require three stages of filters 11, 13B, 14 and 32, 33A, 34. This, however, is not exclusive and the invention can be applied to various other regions or zones which require predetermined conditions of atmosphere.

What is claimed is:

1. An apparatus for maintaining the concentration of at least sulfur oxides and nitrogen oxides below a predetermined level and controlling the internal atmosphere of a semiconductor wafer treating chamber and preventing clouding of the mirror-finished surface of a semiconductor wafer comprising:

a fluid passage for introducing air from an external environment into an internal atmosphere in a semiconductor wafer treating chamber in which a surface treatment of said semiconductor wafer is conducted;

a first removing means disposed in said fluid passage for removing water mist and dust particles;

a second removing means, disposed in said fluid passage located downstream from said first removing means with respect to the direction in which the air is introduced, for removing fine dust which is not removed by said first removing means; and an absorbing scrubber, disposed in said fluid passage located upstream said first removing means with respect to the direction in which air is introduced into said treating chamber, for absorbing sulfur oxides, and nitrogen oxides from the external environment causing clouding of the surface of said semiconductor wafer.

2. The apparatus according to claim 1, in which said second removing means further includes air condition means for removing moisture from the air and heating means for heating the air.

3. The apparatus according to claim 2, including a semiconductor water treating chamber communicated to said fluid passage downstream from said second removing means, and a filter means for removing fine dust particles as the air enters the treating chamber.

4. The apparatus according to claim 3 including a second communicating passage for communicating said internal atmosphere in said semiconductor wafer treating chamber and said second removing means.

* * * * *